United States Patent [19]

Smith

[11] Patent Number: 5,590,611

[45] Date of Patent: Jan. 7, 1997

[54] LIQUID FERTILIZER INJECTION SYSTEM

[76] Inventor: Casey P. Smith, 902 East Ave., Holdrege, Nebr. 68949

[21] Appl. No.: 397,412

[22] Filed: Mar. 1, 1995

[51] Int. Cl.⁶ .................................................. A01C 23/00
[52] U.S. Cl. ........................ 111/127; 111/121; 172/572; 172/507; 172/508
[58] Field of Search ....................................... 111/118, 120, 111/121, 122, 127, 163, 167, 168; 239/162, 663, 166, 289; 172/572–573, 264, 602, 508, 509

[56] References Cited

U.S. PATENT DOCUMENTS

| 557,868 | 4/1896 | Packham | 111/168 |
|---|---|---|---|
| 1,012,278 | 12/1911 | Reiske | 111/163 |
| 1,026,410 | 5/1912 | Schutt | 111/168 |
| 1,651,938 | 12/1927 | Wolf | 172/602 |
| 2,879,855 | 3/1959 | Kleiser | 172/573 |
| 3,472,554 | 10/1969 | Hopkins | 172/602 |
| 4,004,640 | 1/1977 | Bland | 172/572 |
| 4,986,200 | 1/1991 | Johnston | 111/121 |
| 5,027,724 | 7/1991 | Ptacek et al. | 111/121 |
| 5,407,134 | 4/1995 | Thompson et al. | 111/118 |

FOREIGN PATENT DOCUMENTS

| 6303802 | 11/1994 | Japan | 172/509 |
|---|---|---|---|

OTHER PUBLICATIONS

Advertisement for "Trailplace," a Fertilizer Placement Tool for Planters, by Hawkins Manufacturing, Inc., 2120 East 4th Ave., Holdrege, Nebraska, 68949–3013. (1 page).

Advertisement for "Trail–Jet Fertilizer," a fertilizer placement tool, from Farm Equipment, Feb. 1995 (2 pp.).

Primary Examiner—Terry Lee Melius
Assistant Examiner—Victor Batson
Attorney, Agent, or Firm—Kerkam, Stowell, Kondracki & Clarke, P.C.; Edward J. Kondracki

[57] ABSTRACT

A liquid fertilizer injection system is provided that includes a single coulter blade mounted on a support arm extending from a bracket which is adapted to be pivotally coupled to an attachment apparatus which attaches the system to a propulsion means. A spray arm is adapted at one end is attached to the support arm and is adjustable in the up and down direction by means of a slot bracket. A second end of the spray arm is attached to a spray nozzle which is adapted to receive a flexible tube. The flexible tube transfers, to the nozzle, liquid fertilizer, under pressure, from a liquid reservoir via a pump. The system further includes a tension spring assembly which provides a down-force, determined by the user, to the coulter assembly, while isolating the system from the propulsion means, thereby preventing lifting of a planter or seeder to which the system is connected off of the ground.

11 Claims, 2 Drawing Sheets

LIQUID FERTILIZER INJECTION SYSTEM

FIELD OF INVENTION

The invention relates to automated fertilizer application systems adapted to apply liquid fertilizer directly to a seeded area, and in particular, to an automated fertilizer application system that delivers liquid fertilizer under adjustable pressure to a furrow created by a single coulter blade that follows directly behind an automated seeding or planting device.

BACKGROUND OF THE INVENTION

Liquid fertilizers are used extensively in agriculture, especially in large acreage farms, to promote growth of crops and to ensure germination of planted seeds. There have been many methods and devices employed to apply the liquid fertilizers to newly seeded ground immediately after seeding or planting has been performed.

A conventional device used for delivering liquid fertilizer to newly seeded areas consists of an apparatus that attaches to, and directly follows, an automated seeding or planting apparatus, which is pulled by a tractor, or the like. One commonly employed device is the "Trail Place™" liquid fertilizer delivery system of Hawkins Manufacturing, Inc., of Holdredge, Nebr. The Trail Place™ apparatus is adapted to be connected directly behind an automated seeder or planter and consists of a dual-disk (i.e., double-coulter) which creates a furrow up to three inches deep in the soil directly behind areas that have had seed applied thereto by the automated seeding device. The fertilizer dispenser consists of a flexible tube that is attached at one end to a fertilizer reservoir, such as, for example, a holding tank, which is mounted on a platform that is disposed at a position above the double-coulter assembly. The other end of the flexible tube is left open and is placed between the two coulters that make up the double-coulter assembly.

When the Trail Place™ device is engaged, it follows directly behind the automated seeder. The double-coulter assembly creates a furrow into which the liquid fertilizer is fed through the flexible tube. The open end of the flexible tube is generally attached to a nozzle and directed to the furrow created by the double-coulter assembly. The liquid fertilizer is not applied under pressure and is fed through the flexible tube by the force of gravity. The only mechanism for controlling fertilizer flow is by mechanical adjustment of the nozzle or by changing nozzle size.

There are numerous disadvantages associated with conventional liquid fertilizer delivery systems such as the Trail Place™. These disadvantages include the inability to accurately regulate and control the flow of fertilizer from the reservoir once the fertilization process begins, because the flow is created by gravity and no external pressure or regulation is applied. Therefore, the amount of fertilizer delivered cannot be easily adjusted, especially during operation, based on the speed of the planter or the amount of seed or gallons/acre of coverage desired. In addition, the furrow created by the double-coulter assembly is often quite wide, which results in a furrow that fails to close itself after the fertilizer has been applied. Thus, seed and fertilizer are not subsequently covered by soil and will tend to dry out. Drying out of seed has serious negative implications related to crop yield and overall cost. Therefore, any advantages realized by applying liquid fertilizer may be negated by problems associated with open furrows. Yet another disadvantage of the above-described conventional liquid fertilizer delivery system is that the double-coulter assembly has a tendency to become fouled or inoperative in moist soil or muddy conditions. This may result in destruction of the seed beds and/or improper application of the liquid fertilizer due to the reduced or improper rotation of the coulters.

One of the most serious disadvantages associated with this conventional liquid fertilizer application system is the inability of the double-coulter assembly to swivel or pivot with respect to the automated seeding or planting apparatus, when following such an apparatus through a turn. This inability to pivot results in destruction of seeded areas caused by the double-coulter assembly crossing over already planted rows. This can significantly reduce the effective seeding area and, thus, the effective yield of the farmed area by eliminating a usable portion of the seedable areas at the ends of the bedding rows.

SUMMARY OF THE INVENTION

The present invention, therefore, provides an new and improved liquid fertilizer application system that overcomes the deficiencies of known liquid fertilizer application systems. In particular, the present invention provides an apparatus having a single coulter and applies liquid fertilizer under user-adjustable pressure directly to a furrow created by the coulter at a user-adjustable height from the furrow. Moreover, the apparatus of the present invention has the ability to swivel or pivot relative to the device to which it is attached.

It is, therefore, an object of the present invention to provide a liquid fertilizer application system that overcomes the disadvantages of prior systems and provides further operational and functional advantages.

It is another object of the present invention to provide a liquid fertilizer delivery system in which the liquid fertilizer is applied under user-adjustable pressure to apply fertilizer easily and efficiently.

It is another object of the present invention to provide a liquid fertilizer delivery system having a nozzle for delivering the liquid fertilizer, whose height from the ground is adjustable by the user to optimize the application of the fertilizer.

It is yet another object of the present invention to provide a liquid fertilizer delivery system wherein the furrow into which the liquid fertilizer is delivered is created by a single coulter and is very narrow, thereby allowing the furrow to close automatically following the application of liquid fertilizer.

It is still another object of the present invention to provide a furrowing assembly that is adapted to swivel or pivot with respect to the means attaching the furrowing assembly to the seeder, thereby avoiding undue destruction of seeded areas, especially in the turns.

It is yet another object of the present invention to provide an assembly which prevents fouling of the coulter assembly in moist soil or muddy conditions.

Another object of the present invention is to provide a fertilizer delivery system that will not hold the planter out of the ground, while providing an adjustable down-force keeping the coulter in the desired position to achieve the desired furrowing.

These and other objects, and their attendant advantages, are achieved by the present invention, which provides a liquid fertilizer injection device, comprising: a single coulter blade having a predetermined radius; a bracket comprising a first support arm extending from a shaft portion, said first support arm being operatively connected to said coulter blade to allow said coulter blade to rotate about said connection; a clamp adapted to receive said shaft portion to provide rotational coupling of said shaft to said clamp; a rear support arm, a rear end of which is adapted to be coupled to said clamp, said rear support arm being pivotally connected with a front support arm, said front support arm being adapted to be connected to a propulsion member; a tension spring adapted to be coupled at a first end to said front support arm and at a second end to said rear support arm, a tension of said tension spring being adjusted by adjustment of a spring rod extending through said tension spring; a spray arm connected at a first end to said first support arm, said spray arm adapted to house a nozzle body at a second end thereof, wherein said spray arm is adapted to adjust a position of said nozzle body up and down; and a flexible hose connected at a first end to said nozzle body and at a second end to a pump, said pump being adapted to pump liquid through said flexible hose.

BRIEF DESCRIPTION OF THE DRAWINGS

The invention will be described in detail herein with reference to the following drawings, in which like reference numerals refer to like elements throughout the several views, and wherein.

DETAILED DESCRIPTION OF THE PREFERRED EMBODIMENTS

Figure 1:
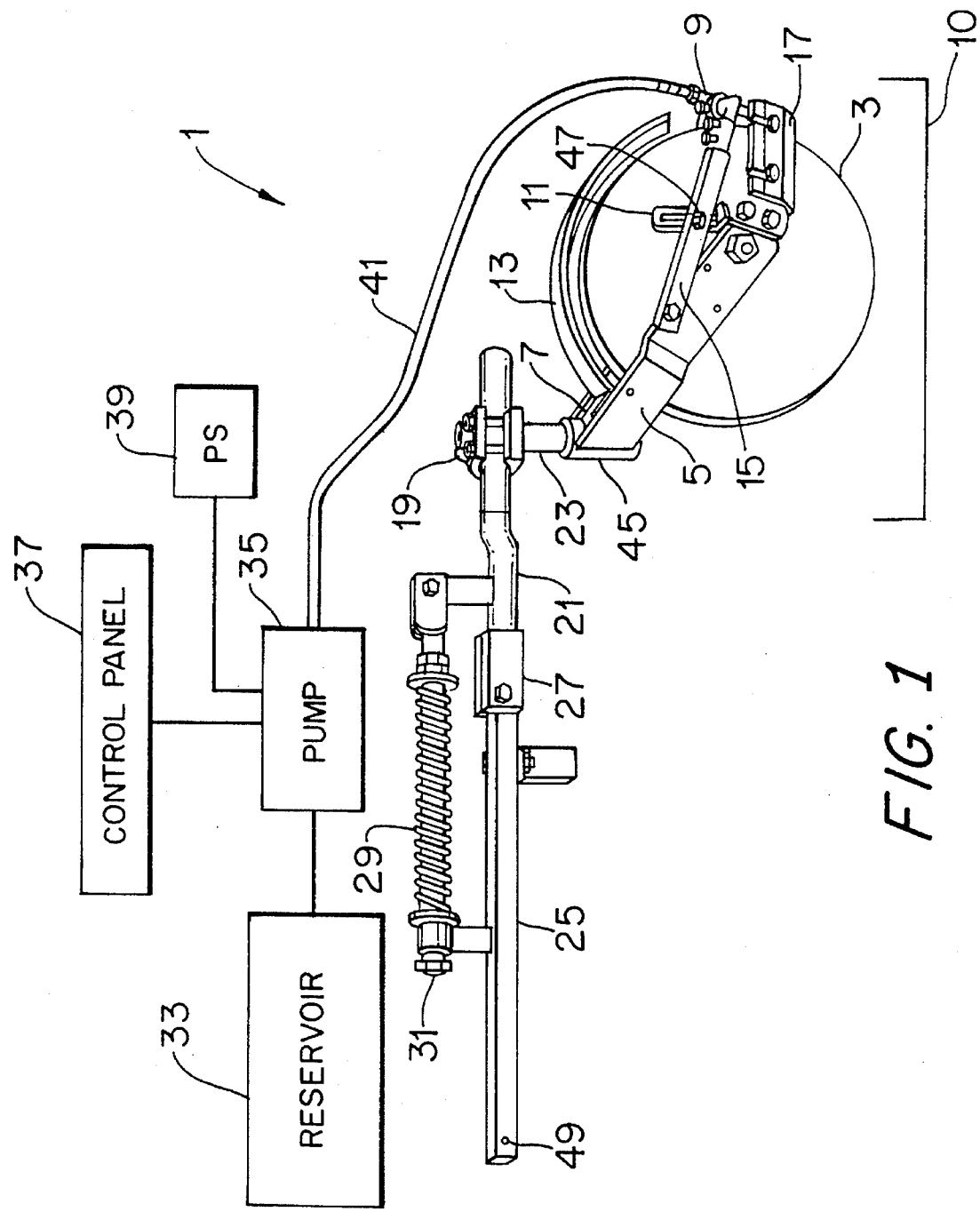
FIG. 1 is a side view of the liquid fertilizer injection system according to the present invention.

FIG. 1 shows a side view of the liquid fertilizer injection system according to the present invention. As shown in FIG. 1, the liquid fertilizer injection system 1 of the present invention includes a single disk or coulter 3 adapted to rotate about its central axis and held by support arms 5, 7 extending from a bracket 45. Also extending from the bracket 45 is a post 23 which is adapted to be operatively coupled to a clamp 19 which is, in turn, attached to a rear support arm 21 of the assembly 1, which provides connection of the liquid fertilizer injection system 1 to a tractor, or any other suitable propulsion means (not shown). It is preferred that the rear support arm 21 be knurled or similarly roughened at the area where the clamp 19 is attached, to prevent slippage of the clamp 19 with respect to the rear support arm 21 when the clamp 19 is engaged with the coulter assembly 10. Additionally, the clamp 19 and post 23 are adapted to provide a pivot point about which the coulter assembly 10 can swivel in a turn, thereby preventing damage to planted rows that can occur if the coulter assembly 10 cannot swivel and is forced to cross over the planted rows.

The assembly that provides connection of the liquid fertilizer injection system 1 to a propulsion means, such as, for example, a tractor, or the like, includes a rear support arm 21 connected to a front support arm 25. The connection of the rear support arm 21 to the front support arm 25 is accomplished using a bracket assembly 27 that allows the rear support arm 21 to pivot in an up and down manner with respect to the front support arm 25, which is usually in a fixed position by virtue of its connection to the propulsion means via a seeder or planter, or the like (not shown). In addition to the bracket 27, the front and rear support arms 25, 21 are connected via a tension spring 29 having an adjustable spring rod 31 extending therethrough and being connected at one end to the front support arm 25 and at the other end to the rear support arm 21. The tension spring 29 and pivoting bracket 27 arrangement provides and arrangement that allows the user to adjust the down-force applied to the coulter assembly 10 by torquing the spring rod 31 in a desired direction. Having the dual arrangement of the pivoting bracket 27 and the tension spring 29 as described above, further permits the rear support arm 21 to provide a desired down-force without forcing or lifting the planter (not shown) off the ground. This is accomplished by effectively isolating the front support arm 25 from the rear support arm 21 via the pivoting bracket 27 and tension spring 29 assembly.

The coulter assembly 10 also includes a safety shield 12 which serves to protect the user from injury by preventing inadvertent contact with the coulter 3. A tube fitting 9 is adapted to receive a flexible tube 41 on one end and is connected to a nozzle 43 (shown in FIG. 2) on the other end. The fitting 9 and nozzle 43 assembly is adapted to be adjustably connected to the support arm 5 of the coulter assembly 10 via a spray arm 15. The spray arm 15 can be adjusted up or down, thereby controlling the height from the ground of the fitting 9 and nozzle 43 assembly. Adjustment of the spray arm 15 is accomplished by means of a slot bracket 11, which includes an adjustment bolt 47. By loosening the adjustment bolt 47, the spray arm 15, to which the fitting 9 and nozzle 43 are attached, can be moved up or down along a distance defined by the slot in the bracket 11. When the desired level is attained, the adjustment bolt 47 is tightened to fix the position of the spray arm 15, and thus, the position of the fitting 9 and nozzle 43.

Liquid fertilizer is applied under pressure via the fitting 9 through the nozzle 43. A flexible tube 41 extends from a pump 35 which pumps liquid fertilizer from a reservoir 33, which may be disposed on a platform (not shown) attached to the liquid fertilizer injection system 1 at a predetermined position, such as, for example, at a location above the tension spring 29 or front support arm 25. The pump 35 may be any of a variety of well-known commercially available pumps that are preferably either electrically or hydraulically powered by an appropriate power supply 39. Additionally, it is preferred that the pump be housed inside the reservoir 33, however, this arrangement is, by no means, absolutely necessary, i.e., the pump 35 may be external to the reservoir 33. The pump 35 delivers liquid fertilizer from the reservoir 33 to the nozzle 43 via flexible tube 41, under a pressure that is preferably user-adjustable via a control panel 37 which is preferably located in or on the vehicle to which the liquid fertilizer injection system 1 is attached.

The liquid fertilizer injection system 1 of the present invention may also optionally be provided with a second support arm 7 extending from the bracket 45 on a side of the coulter 3 opposite that of the first support arm 5 to provide additional support to the coulter assembly 10. In addition, the coulter assembly 10 may be provided with a scraper 17 which is adjustably attached to the first and/or second support arm 5, 7. The scraper 17 is provided to remove any accumulated soil from the coulter 3 to prevent fouling of the system 1, particularly in moist or muddy soil conditions. A second scraper (not shown) may also be attached on a second side of the coulter 3 in substantially the same position as the scraper 17 on the first side of the coulter 3, thereby providing additional cleaning and scraping of the coulter 3.

Figure 2:
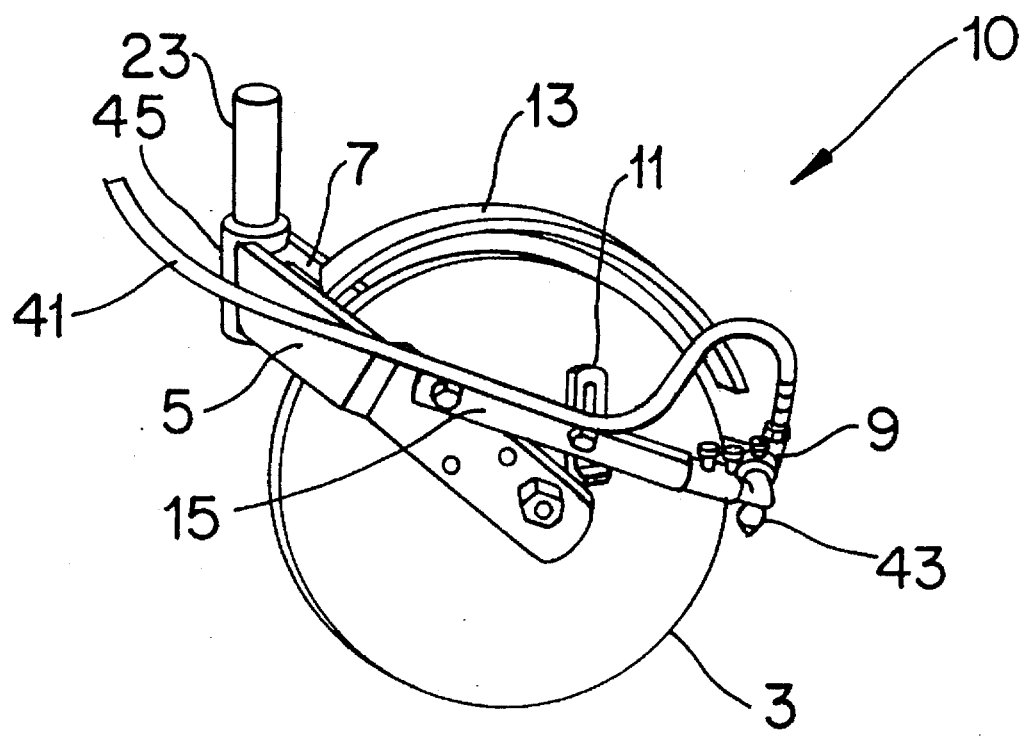
FIG. 2 is a rear perspective view of the coulter assembly of the liquid fertilizer injection system of the present invention.

The operation of the liquid fertilizer injection system 1 will be described with reference to FIGS. 1 and 2. Before beginning operation of the system 1, there are a number of factors that must be taken into consideration, and a number of adjustments that must be made depending upon the conditions under which the system 1 is to be used. These factors include fertilizer coverage, which involves the rate of flow of the fertilizer, the pressure under which the fertilizer is to be applied and the gallons/acre desired or recommended, depending upon seed and soil conditions. In addition, the ground speed at which the apparatus is to be propelled plays an important role in determining rate of flow and pressure. Another important factor for consideration is the distance of the nozzle 43 from the ground and the depth of the furrow created by the coulter 3. For example, increased furrow depth requires higher nozzle pressure and may further require lower speed. The pressure to be employed is determined using nozzle size, gallons per acre and miles per hour of the vehicle. Because a pump is used to deliver the liquid, application rate may be determined by pump settings and not only the nozzle size, therefore, all of the above factors must be taken into consideration prior to operating the system of the present invention. Once all the parameters have been determined and the appropriate adjustments made, the system will be ready for use.

Determination of the operating parameters and adjustment of the device such that the operating parameters will be followed are matters that will be within the level of ordinary skill in the art, after having understood the present disclosure. Additionally, fertilizer dealers and distributors will generally provide the appropriate operating parameters to users depending upon the type of fertilizer used and the soil conditions to which it is applied. For example, starter fertilizer is generally applied at a depth of four inches using approximately 30 p.s.i. pressure at normal ground speeds. However, as set forth above, system calibration is dependent upon a number of factors and will generally be within the level of ordinary skill in the art, once the various control features set forth herein are presented to those of ordinary skill.

The front support arm 25 is adapted to be connected to an automated planter or seeder, or the like (not shown). The front support arm 25 may be connected to the planter by a bolt (not shown) extending through an opening 49 located at one end of the front support arm 25 opposite the end to which the pivoting bracket 27 is attached. The coulter assembly 10 is then attached to the rear support arm 21 by inserting the post 23 of the coulter assembly 10 into an opening (not shown) in the clamp 19 such that the post 23 is allowed to rotate within its connection to the clamp 19. There are many alternative configurations for forming the swivel or pivot connection of the coulter assembly 10 to the clamp 19. For example, the clamp 19 may be provided with an outer sleeve (not shown) which is adapted to fit over the post 23 to ensure that the post 23 will remain connected to the clamp 19 even under uneven planting conditions. The down-force is adjusted to the extent necessary to cause the coulter 3 to create a furrow of the desired depth, depending upon the type of fertilizer, coverage and application that is required. The down-force adjustment is accomplished by varying the tension created by the tension spring 29. This variation of tension is effected by adjustment of the spring rod 31. Loosening the spring rod 31 creates less down-force, i.e., resulting in a shallower furrow, while tightening the spring rod causes greater down-force, i.e., resulting in a deeper furrow. As described above, the combination of the tension spring 29, spring rod 31 and pivoting bracket 27 serves to provide the desired down-force, while also isolating the coulter assembly 10 from the planter, thereby keeping the fertilizer injection system 1 from raising the planter off the ground during operation.

Once the initial settings have been determined and the proper adjustments made, the liquid fertilizer injection system 1 is ready for operation. As the system 1 is pulled by the propulsion means (not shown), the coulter 3 rotates about its central axis and cuts a furrow of a predetermined depth. The coulter 3 is thin and has a edge that is preferably flat or double-beveled. As the coulter 3 cuts the furrow, liquid fertilizer is applied directly to the newly cut furrow under pressure via nozzle 43. Liquid fertilizer is fed from the reservoir 33 to the flexible tube 41 by the pump 35. The pump 35 is preferably a single piston liquid pump which is capable of delivering the liquid fertilizer at the desired pressure, usually in a range up to 80 p.s.i. The pump 35 is also preferably either electrically or hydraulically powered by the power supply 39. It is also preferable to be able to adjust the pump 35 settings, i.e., on, off and pressure, etc., from the cab of the propulsion means via a control panel 37. The fertilizer moves through the flexible tube 41 to the fitting 9. The fitting 9 is adapted to receive the flexible tube 41 at one end, and is attached to the nozzle 43 at the other end. The fertilizer is then ejected under pressure through the nozzle 43 directly into the furrow created by the coulter 3.

Having a single thin coulter 3 creates a narrow furrow which will generally automatically close itself. This is a very important feature of the present invention because an automatically closing furrow is instrumental in preventing seed dry-out and similar deleterious effects of prior application systems. However, because the narrow furrow tends to close quickly, it is extremely important to set the height of the nozzle 43 from the ground, and to set the pressure at which the fertilizer is delivered to ensure injection of the fertilizer into the furrow prior to the closing of the furrow.

Additionally, in moist soil or muddy conditions, there is a tendency for soil to accumulate on the coulter 3, which, if left untreated, could potentially foul the coulter assembly 10 and cause improper and ineffective operation of the system 1. Thus, the coulter assembly 10 is optionally supplied with a scraper 17 which removes accumulated soil from the coulter 3 as it rotates. The scraper 17 may be disposed on one or both sides of the coulter 3.

Another important feature of the invention is the caster or swivel arrangement of the post 23 of the coulter assembly 10 and the clamp 19 assembly. This pivoting arrangement allows the coulter assembly 10 to swivel when the planter, and thus the system 1, is turning, thereby providing smooth following of the planter without destroying or crossing over already planted rows. It is also a desirable feature of the present invention that the pump controls are able to be accessed via a control panel 37 inside the cab of the propulsion means. This allows the operator to adjust the pressure during the seeding and fertilizing operation, if necessary, and allows the operator to regulate the flow rate, and to turn the flow on and off, which helps to conserve fertilizer and save time, as the operator is not required to stop the process to make the adjustment.

In addition, as more and more environmental regulations regarding the application and use of fertilizers, herbicides, pesticides, and the like, are promulgated, compliance with these regulations has become increasingly difficult due to the inability of farmers to accurately control the application and amounts of liquid fertilizers, and the like, that may adversely effect the environment. The ability to accurately control the flow of liquid fertilizer in the manner described above provides the additional advantage of making compliance with certain environmental control regulations easier and more effective.

While the invention has been described herein in conjunction with specific embodiments thereof, it is evident that may alternatives, modifications and variations will be apparent to those skilled in the art. As an example, it will be understood that the present invention is not limited to use with liquid fertilizers, but may be used with any liquid and for any application. Accordingly, the preferred embodiments of the invention, as set forth herein, are intended to be illustrative, and not limiting. Various changes may be made without departing from the true spirit and full scope of the invention, as defined in the following claims.

What is claimed is:

1. A liquid fertilizer injection apparatus adapted to be connected to and towed by a propulsion vehicle for applying liquid fertilizer under pressure from a source carried by the vehicle to a furrow formed in the ground comprising:

a coulter blade assembly, including a coulter supporting bracket, a coulter blade mounted to said bracket for rotation about a central horizontal axis to form said furrow;

a tow arm having a forward end and a rearward end, said forward end adapted for connection to the tractor;

means on the rearward end of the tow arm for supporting the coulter blade assembly for rotation about a vertical axis, said means including a clamp mounted to the rearward end of the tow arm and a post mounted to said clamp; said coulter supporting bracket being mounted to said post and including a first support arm extending from said bracket for supporting said coulter blade for rotation about said central horizontal axis;

a bracket having a slot for adjustably positioning the height of a liquid fertilizer injection nozzle; said slotted bracket being mounted to said first support arm means for connecting said liquid fertilizer injection nozzle to the source of liquid fertilizer under pressure;

a second support arm, said second support arm having a first end, a second end and an intermediate section, said first end of said second support arm being pivotally connected to said first support arm, said nozzle being mounted to said second end of said second support arm;

and first means on the intermediate section of said second support arm positionable in said slot of the slotted bracket for adjustably positioning the height of said nozzle.

2. A liquid fertilizer injection apparatus as set forth in claim 1 wherein said tow arm includes a front support arm and a rear support arm, a pivoting bracket pivotally connecting said front support arm to said rear support arm and a tension spring assembly connected to said front and rear support arms, said tension spring assembly having means to adjust the down-force applied to the coulter blade assembly.

3. A liquid fertilizer injection apparatus as set forth in claim 2 wherein said tension spring assembly includes a tension spring disposed substantially parallel to said tow arm and being pivotally connected at one end to said rear support arm and fixedly connected to said front support arm, and a rotatable torquing spring rod extending through said tension spring for adjusting the down-force applied to the coulter blade.

4. A liquid fertilizer injection apparatus as set forth in claim 1 wherein said first means on the intermediate section further includes locking means for setting the position of the nozzle.

5. The liquid injection apparatus of claim 1 further comprising a second support arm extending from said coulter supporting bracket on a side of said coulter opposite a side on which said first support arm is disposed, said second support arm being coupled to said coulter to provide support thereto.

6. The liquid injection apparatus of claim 1 further comprising a first scraper operatively coupled to said apparatus and positioned adjacent said coulter to scrape debris from said coulter as said coulter rotates.

7. The liquid injection apparatus of claim 6 wherein said first scraper is operatively coupled to said first support arm, said apparatus further comprising a second support arm extending from said bracket on a side of said coulter opposite a side on which said first support arm is disposed, said second support arm being coupled to said coulter to provide support thereto; and a second scraper operatively coupled to said second support arm and positioned adjacent said coulter to scrape debris from said coulter as said coulter rotates.

8. The liquid injection apparatus of claim 1 wherein the clamp mounted to the rearward end of the tow arm receives said post so as to provide rotational coupling of said post to said clamp.

9. The liquid injection apparatus of claim 1 further comprising a liquid reservoir containing the liquid fertilizer to be injected, said liquid reservoir being operatively coupled to a pump.

10. The liquid injection apparatus of claim 9, further comprising a control panel for controlling operating parameters of said pump, said control panel being adapted to be located remotely from said pump.

11. The injection apparatus of claim 1, further comprising a shield extending from said coulter supporting bracket along an upper portion of said coulter.

* * * * *